United States Patent
Thanayankizil et al.

(10) Patent No.: US 10,172,076 B2
(45) Date of Patent: Jan. 1, 2019

(54) UNIFIED IN-VEHICLE WI-FI SERVICE

(71) Applicant: GM GLOBAL TECHNOLOGY OPERATIONS LLC, Detroit, MI (US)

(72) Inventors: Lakshmi V. Thanayankizil, Rochester Hills, MI (US); Wen Gu, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 97 days.

(21) Appl. No.: 15/292,693

(22) Filed: Oct. 13, 2016

(65) Prior Publication Data

US 2018/0109997 A1 Apr. 19, 2018

(51) Int. Cl.
*H04W 48/16* (2009.01)
*H04L 29/08* (2006.01)
*H04W 84/12* (2009.01)

(52) U.S. Cl.
CPC ............ *H04W 48/16* (2013.01); *H04L 67/12* (2013.01); *H04W 84/12* (2013.01)

(58) Field of Classification Search
CPC ........ H04W 48/16; H04W 84/12; H04L 67/12
USPC ....................................................... 370/338
See application file for complete search history.

(56) References Cited

U.S. PATENT DOCUMENTS

| 5,257,399 | A | * | 10/1993 | Kallin | .................. | H04W 72/08 |
| | | | | | | 455/434 |
| 8,688,320 | B2 | * | 4/2014 | Faenger | ................ | B60K 35/00 |
| | | | | | | 340/500 |
| 2007/0141984 | A1 | * | 6/2007 | Kuehnel | ................. | H04W 4/80 |
| | | | | | | 455/41.2 |
| 2011/0116426 | A1 | * | 5/2011 | Polonsky | ............... | H04W 4/18 |
| | | | | | | 370/310 |
| 2015/0117430 | A1 | * | 4/2015 | Zhuang | .................. | H04L 67/16 |
| | | | | | | 370/338 |

* cited by examiner

*Primary Examiner* — Stephen J Clawson
(74) *Attorney, Agent, or Firm* — David Willoughby; Reising Ethington P.C.

(57) ABSTRACT

A system and method of providing a plurality of services through a plurality of vehicle-generated Wi-Fi channels includes: generating at a first Wi-Fi module a first Wi-Fi channel that includes a master list of services provided by the first Wi-Fi module as well as one or more other Wi-Fi modules; receiving a request for a service included on the master list at the first Wi-Fi module from a wireless device communicating; determining that the service is not available through the first Wi-Fi module; identifying a second Wi-Fi module that provides the service; and transmitting a message to the wireless device identifying the second Wi-Fi module that provides the service identified in the request.

16 Claims, 2 Drawing Sheets

UNIFIED IN-VEHICLE WI-FI SERVICE

TECHNICAL FIELD

The present invention relates to Wi-Fi communications and, more particularly, to providing a plurality of services through a plurality of Wi-Fi channels provided by more than one Wi-Fi module in a vehicle.

BACKGROUND

As short-range wireless communications become more prevalent, the number of available Wi-Fi channels increases. When within communication range of these Wi-Fi channels, wireless devices capable of detecting and communicating via these channels, such as smart phones or tablets, select one signal over another. This selection is often left to the wireless device user who can identify a particular Wi-Fi channel by its service set identification (SSID) and choose one of the channels. The wireless device user may base the selection on a detected signal strength that is displayed with the SSID or whether or not access to the Wi-Fi signal is restricted by a password.

When different Wi-Fi channels are provided in a vehicle, a number of different problems exist. For example, the wireless device user who identifies more than one Wi-Fi channel in a vehicle may see that those channels have very similar signal strengths and that the user has access to both Wi-Fi channels. Without some way of differentiating these channels, the wireless device user may not know which Wi-Fi channel to select. Further, vehicles may offer different services through separate Wi-Fi channels and the wireless device user may not know which Wi-Fi channel(s) to select for which service(s). It would be helpful to direct the wireless device to select the most appropriate Wi-Fi channel among more than one generated at a vehicle.

SUMMARY

According to an embodiment of the invention, there is provided a method of providing a plurality of services through a plurality of vehicle-generated Wi-Fi channels. The method includes generating at a first Wi-Fi module a first Wi-Fi channel that includes a master list of services provided by the first Wi-Fi module as well as one or more other Wi-Fi modules; receiving a request for a service included on the master list at the first Wi-Fi module from a wireless device; determining that the service is not available through the first Wi-Fi module; identifying a second Wi-Fi module that provides the service; and transmitting a message to the wireless device identifying the second Wi-Fi module that provides the service identified in the request.

According to another embodiment of the invention, there is provided a method of providing a plurality of services through a plurality of vehicle-generated Wi-Fi channels. The method includes generating at a vehicle a first Wi-Fi channel that includes a master list of services provided by a first Wi-Fi module and a second Wi-Fi module; generating at the vehicle a second Wi-Fi channel that includes the master list of services provided by the first Wi-Fi module and the second Wi-Fi module; receiving a request for a service included on the master list at the first Wi-Fi module from a wireless device communicating via the first Wi-Fi channel; determining that the service is not available through the first Wi-Fi module; identifying the second Wi-Fi module as providing the service; and transmitting a message to the wireless device identifying the second Wi-Fi module that provides the service identified in the request.

According to yet another embodiment of the invention, a Wi-Fi module that communicates with a wireless device to provide a plurality of services through a vehicle-generated Wi-Fi channel includes a short-range wireless antenna and a microprocessor configured to generate a Wi-Fi channel including a master list of services provided by the Wi-Fi module via the short-range wireless antenna; receive a request for a service included on the master list of services at the Wi-Fi module from the wireless device communicating via the Wi-Fi channel; determine that the service identified in the request is provided by another Wi-Fi module; and transmit a message to the wireless device identifying another Wi-Fi module for providing the service identified in the request

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and method described below involves providing a plurality of services through a plurality of vehicle-generated Wi-Fi channels. A vehicle can include two or more Wi-Fi modules that each generates a Wi-Fi channel. In the past, each Wi-Fi channel may have broadcast its own SSID and offered a particular group of services that may not be offered by other Wi-Fi channels. This could cause some confusion for a vehicle occupant who may not know which channel to select and, depending on which Wi-Fi signal is selected, the wireless device may not have access to a desired service. When a wireless device user attempts to communicate with or through the vehicle via one of these Wi-Fi channels and access a particular service, the user may find that the desired service is not provided through the Wi-Fi signal the wireless device has attached to.

The present method involves broadcasting a master list of services provided by all of the Wi-Fi channels in the vehicle using a single SSID. When the wireless device begins communicating using one of the Wi-Fi channels and makes a service request, the Wi-Fi module providing the Wi-Fi channel can receive the request and determine if it provides that service among all of the services offered by the master list. If so, the Wi-Fi channel can be used to provide the service; otherwise, the Wi-Fi module can identify which of the other Wi-Fi channels in the vehicle can be used to provide the requested service. The Wi-Fi module receiving the request can then communicate the identity of the Wi-Fi channel or Wi-Fi module that provides the service to the wireless device. The wireless device can then initiate the service using the identified Wi-Fi channel.

Communications System—

Figure 1:
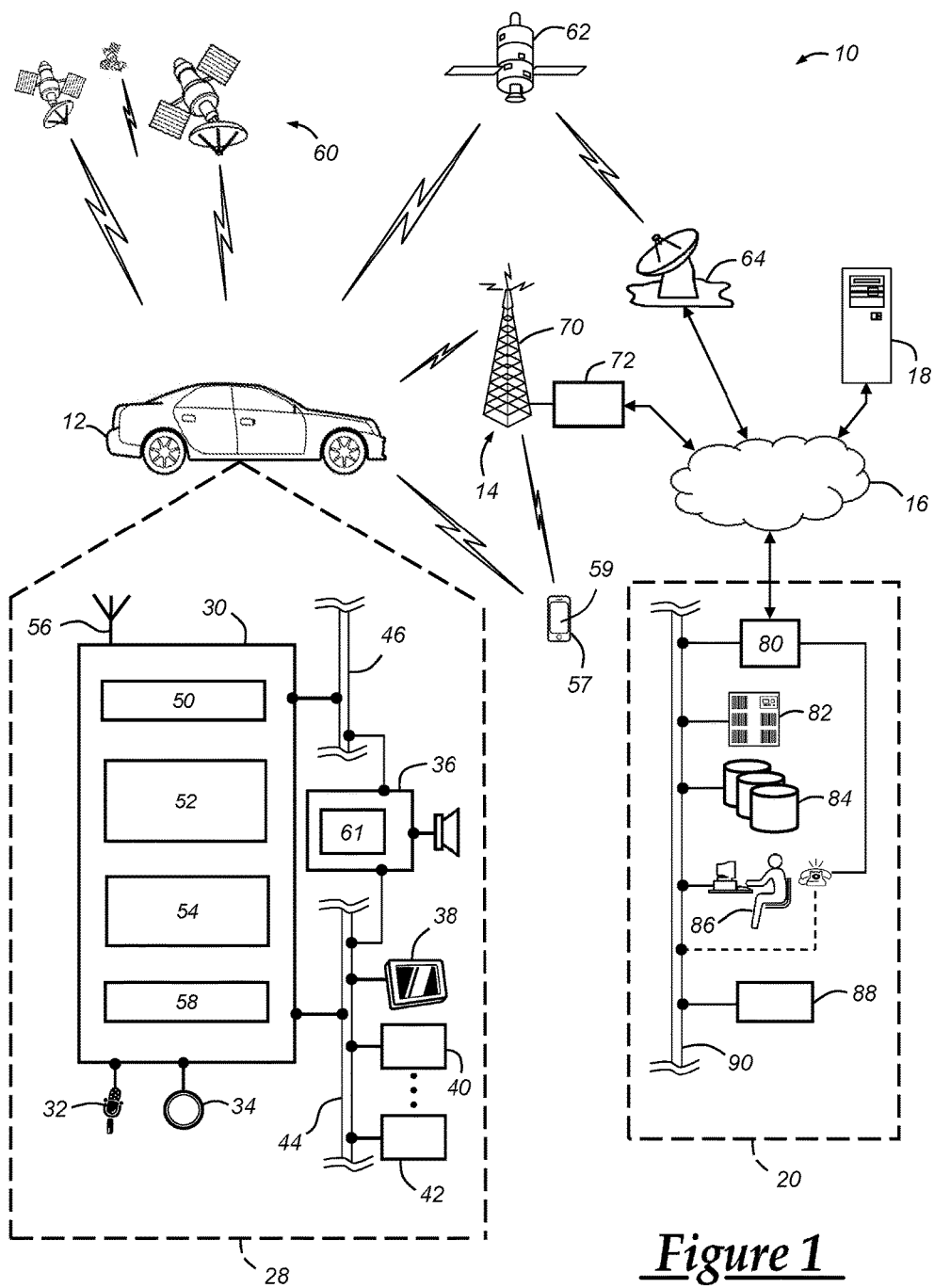
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of other vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is itself a vehicle system module (VSM) and can be implemented as an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™ Wi-Fi direct, Bluetooth™, or near field communication (NFC). When used for packet-switched data communication such as TCP/IP, the telematics unit can be configured with a static IP address or can be set up to automatically receive an assigned IP address from another device on the network such as a router or from a network address server. The short-range wireless communications protocols can generally be referred to as "Wi-Fi."

The wireless networking carried out by the vehicle telematics unit 30 may be implemented using one or more Wi-Fi modules. These modules are transceivers that can use a microprocessor that is either integrated with the Wi-Fi module or accessed from another portion of the vehicle electronics 28, such as processor 52. The Wi-Fi module can include a short-range wireless antenna for communicating with wireless devices capable of using short-range wireless protocols. A variety of Wi-Fi modules are known in the art. One example of a Wi-Fi module providing a Wi-Fi channel is identified by part number WL 1837MOD manufactured by Texas Instruments, however it should be understood that many other Wi-Fi modules could be successfully implemented. Two Wi-Fi modules are shown. A telematics Wi-Fi module 58 is shown integrated with the vehicle telematics unit 30 while an infotainment Wi-Fi module 61 is shown integrated with the audio system 36 and the visual display 38, respectively, but could be implemented. Each of the Wi-Fi modules can provide particular services.

The term "service" as used herein relates to the vehicle hardware or features accessible by a wireless device through a particular Wi-Fi module. For instance, the telematics Wi-Fi module 58 may offer access to the Internet, vehicle data, or both while the infotainment Wi-Fi module 61 permits a vehicle occupant to stream video to the visual display 38. In this example, service refers to Internet access, vehicle data access, or access to the display. The telematics Wi-Fi module 58 may not permit or be able to access the display 38 while the infotainment Wi-Fi module 61 may not permit or be able to access vehicle data or the Internet. A wide variety of other services can be envisioned and the services provided in this example should not be considered to be a complete list of the possible services.

One of the networked devices that can communicate with the telematics unit 30 is a wireless device, such as a smart phone 57. The smart phone 57 can include computer processing capability, a transceiver capable of communicating using a short-range wireless protocol, and a visual smart phone display 59. In some implementations, the smart phone display 59 also includes a touch-screen graphical user interface. The smart phone 57 can also include a GPS module capable of receiving GPS satellite signals and generating GPS coordinates based on those signals. The smart phone 57 also includes one or more microprocessors that execute machine code to generate logical output. Examples of the smart phone 57 include the iPhone manufactured by Apple and the Galaxy manufactured by Samsung, as well as others. While the smart phone 57 may include the ability to communicate via cellular communications using the wireless carrier system 14, this is not always the case. For instance, Apple manufactures devices such as the various models of the iPad and iPod Touch that include the processing capability, the display 59, and the ability to communicate over a short-range wireless communication link. However, the iPod Touch™ and some iPads™ do not have cellular communication capabilities. Even so, these and other similar devices may be used or considered a type of wireless device, such as the smart phone 57, for the purposes of the method described herein.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the telematics unit 30, audio system 36, and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbutton(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Figure 2:
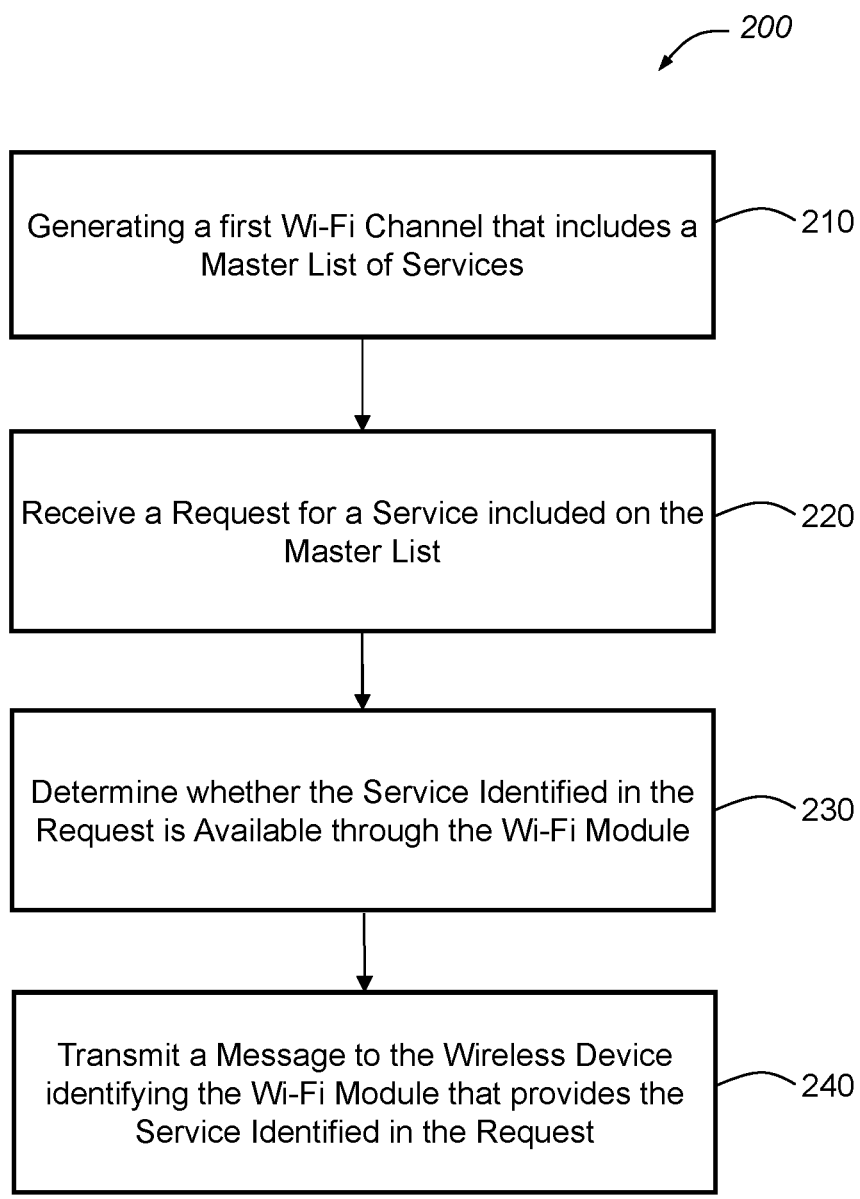
FIG. 2 is a flow chart depicting an embodiment of a method of providing a plurality of services through a plurality of vehicle-generated Wi-Fi signals.

Turning now to FIG. 2, there is shown a method (200) of providing a plurality of services through a plurality of vehicle-generated Wi-Fi channels. The method 200 begins at step 210 by generating, at the telematics Wi-Fi module 58, a first Wi-Fi channel that includes a master list of services provided by the telematics Wi-Fi module 58 as well as all of the other Wi-Fi modules on the vehicle 12. A vehicle occupant may carry the smart phone 57 while entering the vehicle 12 and pair the smart phone 57 with the vehicle 12 so the phone 57 can begin communicating with the vehicle 12 using short-range wireless communications techniques. All of the Wi-Fi modules may broadcast the same SSID so that the vehicle occupant only has one vehicular SSID to choose from when pairing the smart phone 57 with the vehicle 12. The smart phone 57 may establish a communication session with the telematics Wi-Fi module 58 or the infotainment Wi-Fi module 61 enabling the smart phone 57 and the Wi-Fi module 58 to wirelessly communicate packet data. The Wi-Fi module can wirelessly transmit the master list of services to the smart phone 57 via a Wi-Fi channel.

The smart phone 57 can receive the master list of services provided by both the telematics Wi-Fi module 58 and the infotainment Wi-Fi module 61. The telematics Wi-Fi module 58 can provide one set of services while the infotainment Wi-Fi module 61 can provide another set of services. The master list of services includes both the services provided by the telematics Wi-Fi module 58 and the infotainment Wi-Fi module 61 and may be broadcast by both Wi-Fi modules. The smart phone 57 can read the master list of services available and select one or more services to access. As discussed above, the services can be vehicle hardware or features accessible by a wireless device through a particular Wi-Fi module. In one example, the master list of services can include the ability to receive vehicle data from the vehicle telematics unit 30, the ability to stream audio and video to the audio system 36 and display 38, and the ability to access the Internet. In this example, the telematics Wi-Fi module 58 can provide vehicle data and access to the Internet while the infotainment Wi-Fi module 61 can provide the ability to stream audio and video. While the description and examples provided involve two Wi-Fi modules and three different services, it should be appreciated that additional Wi-Fi modules and services could be successfully used in the vehicle 12 with the method. The method 200 proceeds to step 220.

At step 220, a request for a service included on the master list is received at a Wi-Fi module from the smart phone 57. The smart phone 57 can wirelessly transmit a service request to the Wi-Fi module it communicates with through a Wi-Fi channel. The Wi-Fi channel can refer to a short-range wireless communications link defined by an IEEE 802.11 standard. Regardless of which services the Wi-Fi module communicating with the smart phone 57 provides, the Wi-Fi module can receive a service request for any service included in the master list of services. The method 200 proceeds to step 230.

At step 230, it is determined whether the service is available through the Wi-Fi module. If the Wi-Fi module provides the service, the module provides the requested information or functionality requested by the service. However, when the Wi-Fi module communicating with the smart phone 57 determines that the requested service is not available at the Wi-Fi module, the Wi-Fi module can identify the Wi-Fi module providing the requested service. In one example, the smart phone 57 may establish the communication session with the infotainment Wi-Fi module 61. When the smart phone 57 requests vehicle data from the infotainment Wi-Fi module 61, the module 61 can determine that vehicle data is not a service the module 61 provides. The infotainment Wi-Fi module 61 can access a module list that identifies services available at or provided by each Wi-Fi module in the vehicle 12. The infotainment Wi-Fi module 61 can search the module list for the requested service, identify the service on the list, and determine the Wi-Fi module that provides the service. The Wi-Fi module capable of providing the service is identified. Continuing this example, the infotainment Wi-Fi module 61 can search the module list and determine that vehicle data may be provided by the telematics Wi-Fi module 58. The method 200 proceeds to step 240.

At step 240, a message is transmitted to the smart phone 57 identifying the Wi-Fi module that provides the service identified in the request. The short-range wireless communications link between the smart phone 57 and the Wi-Fi module can carry a data message in the form of packet data from the Wi-Fi module to the smart phone 57 that identifies the Wi-Fi module providing the requested service. The smart phone 57 can then end its communication with the infotainment Wi-Fi module 61 in response to the data message and initiate a communication session with the Wi-Fi module identified in the data message—in this example, the telematics Wi-Fi module 58. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of providing a plurality of services through a plurality of vehicle-generated Wi-Fi channels, comprising the steps of:
    (a) broadcasting a message at a first Wi-Fi module over a first Wi-Fi channel that includes a master list of services provided by the first Wi-Fi module as well as one or more other Wi-Fi modules;
    (b) after broadcasting the message, receiving a request for a service included on the master list at the first Wi-Fi module from a wireless device, wherein the request is generated by the wireless device in response to the message;
    (c) determining whether the service is available through the first Wi-Fi module;
    (d) when it is determined that the service is available through the first Wi-Fi module, providing the service using the first Wi-Fi module;
    (e) when it is determined that the service is not available through the first Wi-Fi module, identifying a second Wi-Fi module that provides the service; and
    (f) transmitting a message to the wireless device identifying the second Wi-Fi module that provides the service identified in the request.

2. The method of claim 1, wherein the master list of services comprises Internet access, vehicle data, and audio and video streaming.

3. The method of claim 2, wherein the first Wi-Fi module provides audio and video streaming.

4. The method of claim 2, wherein the second Wi-Fi module provides Internet access and vehicle data.

5. The method of claim 1, wherein the first Wi-Fi module and the second Wi-Fi module broadcast the same service set identification (SSID).

6. The method of claim 1, wherein the wireless device comprises a smart phone.

7. A method of providing a plurality of services through a plurality of vehicle-generated Wi-Fi channels, comprising the steps of:
    (a) broadcasting at a vehicle a master list over a first Wi-Fi channel using a first Wi-Fi module, the master list includes a master list of services provided by the first Wi-Fi module and a second Wi-Fi module;
    (b) broadcasting at the vehicle the master list over a second Wi-Fi channel using the second Wi-Fi module, wherein the first Wi-Fi module and the second Wi-Fi module are both Wi-Fi access points that broadcast the same service set identification (SSID);

(c) receiving a request for a service included on the master list at the first Wi-Fi module from a wireless device communicating via the first Wi-Fi channel;

(d) determining that the service is not available through the first Wi-Fi module;

(e) identifying the second Wi-Fi module as providing the service; and (f) transmitting a message to the wireless device identifying the second Wi-Fi module that provides the service identified in the request.

8. The method of claim 7, wherein the master list of services comprises Internet access, vehicle data, and audio and video streaming.

9. The method of claim 8, wherein the first Wi-Fi module provides audio and video streaming.

10. The method of claim 8, wherein the second Wi-Fi module provides Internet access and vehicle data.

11. The method of claim 7, wherein the wireless device comprises a smart phone.

12. A Wi-Fi module that communicates with a wireless device to provide a plurality of services through a vehicle-generated Wi-Fi channel, comprising: a short-range wireless antenna and a microprocessor configured to broadcast a master list over a Wi-Fi channel via the short-range wireless antenna, the master list including a list of services provided by the Wi-Fi module; after broadcasting the message, receive a request for a service included on the master list of services at the Wi-Fi module from the wireless device communicating via the Wi-Fi channel, wherein the request is generated by the wireless device in response to the broadcasting of the master list; determine that the service identified in the request is provided by a second Wi-Fi module; and transmit a message to the wireless device identifying the second Wi-Fi module for providing the service identified in the request.

13. The Wi-Fi module of claim 12, wherein the master list of services comprises Internet access, vehicle data, and audio and video streaming.

14. The Wi-Fi module of claim 12, wherein the Wi-Fi module provides audio and video streaming.

15. The Wi-Fi module of claim 12, wherein the second Wi-Fi module audio and video streaming.

16. The Wi-Fi module of claim 12, wherein the Wi-Fi module and the second Wi-Fi module broadcast the same service set identification (SSID).

* * * * *